(12) United States Patent
Hole et al.

(10) Patent No.: US 8,204,003 B2
(45) Date of Patent: *Jun. 19, 2012

(54) MOBILE STATION TRANSMISSIONS IN RESPONSE TO NETWORK ACKNOWLEDGMENT POLLING

(75) Inventors: David Philip Hole, Southampton (GB); Satish Venkob, Waterloo, CA (US)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,724

(22) Filed: Sep. 26, 2011

(65) Prior Publication Data

US 2012/0014368 A1 Jan. 19, 2012

Related U.S. Application Data

(63) Continuation of application No. 12/763,842, filed on Apr. 20, 2010.

(60) Provisional application No. 61/171,323, filed on Apr. 21, 2009.

(51) Int. Cl.
   *H04W 4/00* (2009.01)
(52) U.S. Cl. .................................................. 370/328
(58) Field of Classification Search .................... 370/328
   See application file for complete search history.

(56) References Cited

U.S. PATENT DOCUMENTS

| | | | | |
|---|---|---|---|---|
| 2004/0047298 A1* | 3/2004 | Yook et al. | | 370/254 |
| 2006/0067238 A1 | 3/2006 | Olsson et al. | | |
| 2008/0056303 A1* | 3/2008 | Sebire et al. | | 370/474 |
| 2008/0192674 A1* | 8/2008 | Wang et al. | | 370/315 |
| 2008/0307284 A1* | 12/2008 | Aghili et al. | | 714/748 |
| 2009/0098866 A1* | 4/2009 | Timner et al. | | 455/423 |
| 2010/0074104 A1* | 3/2010 | Ryu et al. | | 370/228 |
| 2010/0265886 A1 | 10/2010 | Hole et al. | | |
| 2010/0284338 A1* | 11/2010 | Persson et al. | | 370/328 |
| 2010/0332934 A1* | 12/2010 | Hole et al. | | 714/748 |

FOREIGN PATENT DOCUMENTS

| | | |
|---|---|---|
| WO | 2006118418 | 11/2006 |
| WO | 2008096259 | 8/2008 |
| WO | 2008141016 | 11/2008 |
| WO | 2009088348 | 7/2009 |

OTHER PUBLICATIONS

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)," 3GPP TS 44.060 version 8.4.0, Feb. 2009, (589 pages).

(Continued)

*Primary Examiner* — Kenny Lin

(74) *Attorney, Agent, or Firm* — Hanley, Flight & Zimmerman, LLC

(57) ABSTRACT

Methods and apparatus for mobile station transmissions in response to network acknowledgment polling are disclosed. An example method in a mobile station disclosed herein comprises receiving a poll from a network, the poll requesting piggy-backed ACK/NACK (PAN) information, and transmitting a control message in response to the poll if a previously transmitted data block is associated with a tentative acknowledgment state, the control message including acknowledgment information.

30 Claims, 6 Drawing Sheets

OTHER PUBLICATIONS

International Searching Authority, "International Search Report," issued in connection with International Application No. PCT/CA2010/000597, mailed Jul. 27, 2010, (3 pages).

International Searching Authority, "Written Opinion," issued in connection with International Application No. PCT/CA2010/000597, mailed Jul. 27, 2010, (6 pages).

European Patent Office, "Extended European Search Report," issued in connection with European Patent Application No. 10160513.7, issued on Feb. 2, 2011, (12 pages).

Research in Motion UK Ltd, "Change Request: Priority of EGPRS PDAN vs. TENTATIVE_ACK blocks with PAN," GP-090772, 3GPP TSG-GERAN Meeting #42, Shenzhen, China, May 11-15, 2009, (10 pages).

Research in Motion UK Ltd et al, "Change Request: Priority of EGPRS PDAN vs. TENTATIVE_ACK blocks with PAN," GP-091438, 3GPP TSG-GERAN Meeting #43, Vancouver, Canada, Aug. 31-Sep. 4, 2009, (10 pages).

* cited by examiner

MOBILE STATION TRANSMISSIONS IN RESPONSE TO NETWORK ACKNOWLEDGMENT POLLING

RELATED APPLICATION

This patent is a continuation of U.S. patent application Ser. No. 12/763,842, entitled "Methods and Apparatus to Prioritize Mobile Station Transmissions in Response to Network Acknowledgment Polling" and filed on Apr. 20, 2010, which claims priority from U.S. Provisional Application Ser. No. 61/171,323, entitled "Methods and Apparatus to Prioritize Mobile Station Transmissions in Response to Network Acknowledgment Polling" and filed on Apr. 21, 2009. U.S. patent application Ser. No. 12/763,842 and U.S. Provisional Application Ser. No. 61/171,323 are hereby incorporated by reference in their respective entireties.

FIELD OF THE DISCLOSURE

This disclosure relates generally to mobile station transmission processing and, more particularly, to methods and apparatus to prioritize mobile station transmissions in response to network acknowledgment polling.

BACKGROUND

Many communications systems employ automatic repeat request (ARQ) techniques that allow a transmitter to confirm that data transmissions have been received successfully by an intended receiver. A typical ARQ technique involves the receiver sending acknowledgment information for each received data block, with the acknowledgment information identifying the data block being acknowledged. The acknowledgment information may include a positive acknowledgment (referred to herein as an "ACK") indicating that reception of the data block was successful, a negative acknowledgment (referred to herein as a "NACK") indicating that reception of the data block was unsuccessful, as well as any other appropriate acknowledgment information. For example, in an enhanced general packet radio service (EGPRS) communication system, a receiver can acknowledge receipt of radio link control (RLC) data blocks using RLC/MAC control messages (where MAC refers to medium access control), such as an EGPRS packet downlink ACK/NACK control message or a packet uplink ACK/NACK control message.

In the case of a bidirectional communications system, such as an EGPRS system, the latency associated with using separate control messages to send acknowledgment information can be reduced by including such acknowledgment information with data blocks to be transmitted in the opposite direction. For example, EGPRS supports such latency reduction through its fast ACK/NACK reporting (FANR) feature. The FANR feature allows acknowledgment information to be piggy-backed with an RLC/MAC data block sent from a receiving unit to a transmitting unit through use of a piggy-backed ACK/NACK (PAN) field. However, acknowledgment information received via a PAN field is generally less reliable than acknowledgment information received via a separate packet ACK/NACK control message. As such, a data block associated with an ACK in a received PAN field is treated by the transmitter as being only tentatively acknowledged and, thus, is associated with a tentatively acknowledged state (referred to herein as a "TENTATIVE_ACK" state) until confirmed via an appropriate ACK/NACK control message. Accordingly, under certain circumstances, an EGPRS transmitter may be required to resend blocks associated with a TENTATIVE_ACK state until the appropriate ACK/NACK control message confirmation is received, even though the blocks are likely to have been already received by the receiver.

DETAILED DESCRIPTION

Figure 1:
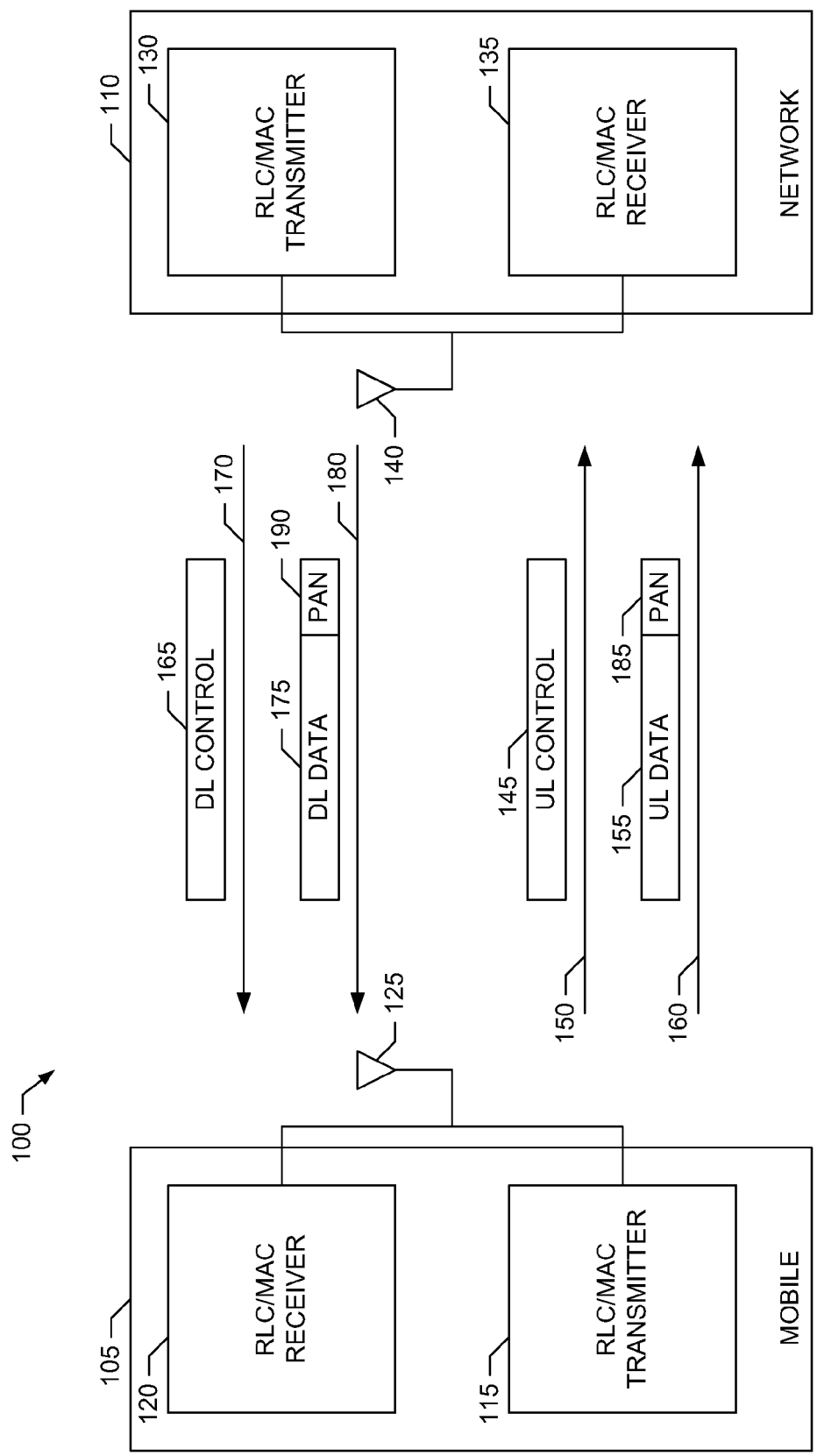
FIG. 1 is a block diagram of an example EGPRS communication system capable of supporting the methods and apparatus described herein.

Methods and apparatus to prioritize mobile station transmissions in response to network acknowledgment polling are disclosed herein. A first example technique to prioritize mobile station transmissions described herein involves a mobile station receiving a poll from a network in communication with the mobile station, with the poll requesting acknowledgment information expected to be transmitted by the mobile station along with a subsequent data block destined for the network. The example prioritization technique also involves the mobile station processing acknowledgment information associated with a set of data blocks previously transmitted by the mobile station to determine a subsequent data block to be transmitted by the mobile station to the network. Furthermore, when the subsequent data block to be transmitted by the mobile station is associated with a tentative acknowledgment state, the example prioritization technique involves the mobile station transmitting a separate control message including at least the requested acknowledgment information instead of transmitting the subsequent data block along with the requested acknowledgment information.

A second example technique to prioritize mobile station transmissions to a network in communication with the mobile station involves the network determining that a second data block received from the mobile station by the network corresponds to a first data block previously received from the mobile station by the network. The second example technique also involves the network determining that the mobile station has associated the second data block with a tentatively acknowledged state. For example, the network can determine that the mobile station has associated the second data block with a tentatively acknowledged state by determining that an elapsed time between receipt of the first data block and receipt of the second data block has met or exceeded a first threshold, by determining that a number of acknowledgments of a certain type (e.g., as part of a PAN) of the first data block sent by the network to the mobile has met or exceeded a second threshold, or any combination thereof. Furthermore, when the network has determined that the second data block has been associated with the tentatively acknowledged state at the mobile station, the second example technique involves the network replacing a first polling message intended for transmission by the network to the mobile station, the first polling message requesting that acknowledgment information be transmitted by the mobile station with a subsequent data block destined for the network, with a second polling message requesting that acknowledgment information be transmitted by the mobile station using a separate control message.

As described in greater detail below, in a particular example implementation of either of the preceding techniques, the mobile station and the network may support the EGPRS FANR feature. In such an example implementation, a poll from the network requesting that acknowledgment information be transmitted by the mobile station along with a subsequent data block corresponds to a poll requesting that a PAN field be transmitted with an uplink RLC/MAC data block destined for the network. Additionally, in such an example implementation, the separate control message including at least the requested acknowledgment information corresponds to an EGPRS packet downlink ACK/NACK control message.

Because PAN fields are used to provide acknowledgment information, the mobile station in such an example stores the acknowledgment information in an acknowledgment state array (also referred to herein as an acknowledge state array). Each element of the acknowledgment state array stores an acknowledgment state associated with a respective data block transmitted to the network within a transmit window. The acknowledgment state corresponds to at least one of an acknowledged state, an unacknowledged state, a pending acknowledgment state and a tentatively acknowledged state. As described in greater detail below, the tentative acknowledgment state indicates that a particular data block was transmitted previously to the network and the network acknowledged receipt of the particular data block. However, the network employed an acknowledgment technique (e.g., such as the FANR technique in which a PAN field is included with the transmission of a downlink RLC/MAC data block to the mobile station) requiring further confirmation from the network element to determine that the particular data block was successfully received by the network.

As described in greater detail below, the example methods and apparatus described herein provide substantial benefits over existing techniques for prioritizing mobile station transmissions. For example, as mentioned above, the FANR feature in EGPRS allows acknowledgment information to be piggy-backed with an RLC/MAC data block through use of a PAN field. However, acknowledgment information received via a PAN field can be less reliable than acknowledgment information received via a separate EGPRS packet downlink ACK/NACK control message or packet uplink ACK/NACK control message. As such, a data block associated with an ACK in a received PAN field is treated by the transmitter as being only tentatively acknowledged and, thus, is associated with a TENTATIVE_ACK state until confirmed via an appropriate ACK/NACK control message. Furthermore, until such confirmation is received, the transmitter cannot move its associated transmit window past a block with a TENTATIVE_ACK state. Accordingly, under certain circumstance, a conventional EGPRS transmitter may be required to resend blocks associated with a TENTATIVE_ACK state, even though the blocks are likely to have been received by the receiver, until such confirmation is received (e.g., to thereby avoid the possibility that the window may become stalled).

In an EGPRS implementation, when a mobile station is polled to provide acknowledgment information for received downlink RLC/MAC data blocks in a PAN field accompanying a subsequent uplink RLC/MAC data block, but the mobile station has no uplink RLC/MAC data blocks to send, the mobile station can respond to the poll with a separate packet downlink ACK/NACK control message. However, even if the only remaining block to transmit is a block having a TENTATIVE_ACK state, a conventional mobile station is required to resend this TENTATIVE_ACK block with an accompanying PAN field in response to the poll, even though the TENTATIVE_ACK block has likely been already received by the network. Unlike a conventional implementation, the transmission prioritization techniques described herein allow the mobile station to send the packet downlink ACK/NACK control message to the network in response to a poll for PAN when the mobile station has only uplink RLC/MAC blocks associated with a TENTATIVE_ACK state remaining to be resent to the network. By not requiring retransmission of these TENTATIVE_ACK blocks in this case, the mobile station can send the packet downlink ACK/NACK control message to the network, which can provide more acknowledgment information than a PAN and which can confirm acknowledgment of any previous downlink RLC/MAC blocks sent to the mobile station, thereby allowing the network to advance its transmit window. In contrast, a conventional implementation would require that the mobile station send a PAN with a retransmitted TENTATIVE_ACK block, even though sending such a PAN provides less acknowledgment information than a packet downlink ACK/NACK control message and does not allow the network to advance its transmit window.

Turning to the figures, a block diagram of an example EGPRS communication system 100 capable of supporting the mobile station transmission prioritization techniques described herein is illustrated in FIG. 1. The EGPRS system 100 includes a mobile station 105 in communication with a network element 110. The example mobile station 105 may be implemented by any type of mobile station or user endpoint equipment, such as a mobile telephone device, a fixed telephone device, a personal digital assistant (PDA), etc. The example network element 110 may be implemented by any type of network communication device, such as a base station system, a radio access network, etc. Although only one mobile station 105 and one network element 110 are illustrated in FIG. 1, the EGPRS system 100 can support any number of mobile stations 105 and network elements 110.

The mobile station 105 of the illustrated example includes an RLC/MAC transmitter 115 and an RLC/MAC receiver 120, each communicatively coupled to an antenna 125. Similarly, the network element 110 of the illustrated example includes an RLC/MAC transmitter 130 and an RLC/MAC receiver 135, each communicatively coupled to an antenna 140. The example RLC/MAC transmitter 115 included in the mobile station 105 sends uplink RLC and MAC information wirelessly via the example antenna 125 for reception via the example antenna 140 by the example RLC/MAC receiver 135 included in the network element 110. As illustrated in FIG. 1, the uplink RLC and MAC information transmitted by the RLC/MAC transmitter 115 to the RLC/MAC receiver 135 includes uplink (designated as "UL" in the figures) RLC/MAC control messages 145 (e.g., such as EGPRS packet downlink ACK/NACK control messages 145 discussed in greater detail below) transmitted via corresponding uplink physical control channels 150, or uplink RLC/MAC data blocks 155 transmitted via corresponding uplink physical data channels 160. As described in greater detail below, the mobile station 105 employs transmission prioritization in which, under certain circumstances, the mobile station 105 can respond to a poll for acknowledgment information from the network element 115 with an EGPRS packet downlink ACK/NACK control message 145 instead of implementing a conventional operation involving retransmitting certain previous uplink RLC/MAC data blocks 155 along with the acknowledgment information requested by the network element 115.

Referring again to FIG. 1, the example RLC/MAC transmitter 130 included in the network element 110 sends downlink RLC and MAC information wirelessly via the antenna 140 for reception via the antenna 125 by the example RLC/MAC receiver 120 included in the mobile station 105. As illustrated in FIG. 1, the downlink RLC and MAC information transmitted by the RLC/MAC transmitter 130 to the RLC/MAC receiver 120 includes downlink (designated as "DL" in the figures) RLC/MAC control messages 165 (e.g., such as packet uplink ACK/NACK control messages 165 discussed in greater detail below) transmitted via corresponding downlink physical control channels 170, or downlink RLC/MAC data blocks 175 transmitted via corresponding downlink physical data channels 180. As described in greater detail below, the network element 110 supports a mobile station transmission prioritization scheme that can be achieved even with conventional mobile stations.

The EGPRS system 100 implements various ARQ techniques to confirm that a transmitted RLC/MAC data block is received successfully by its intended recipient. Accordingly, to acknowledge downlink transmissions, one of the uplink RLC/MAC control messages 145 capable of being sent by the mobile station's RLC/MAC transmitter 115 is an EGPRS packet downlink ACK/NACK control message 145 providing ACK indications for downlink RLC/MAC data blocks 175 received successfully by the mobile station's RLC/MAC receiver 120. Additionally, the EGPRS packet downlink ACK/NACK control message 145 sent by the mobile station's RLC/MAC transmitter 115 provides NACK indications for downlink RLC/MAC data blocks 175 not received successfully by the mobile station's RLC/MAC receiver 120.

Similarly, to acknowledge uplink transmissions, one of the downlink RLC/MAC control messages 165 capable of being sent by the network element's RLC/MAC transmitter 130 is a packet uplink ACK/NACK control message 165 providing ACK indications for uplink RLC/MAC data blocks 155 received successfully by the network element's RLC/MAC receiver 135. Additionally, the packet uplink ACK/NACK control message 165 sent by the network element's RLC/MAC transmitter 130 provides NACK indications for uplink RLC/MAC data blocks 155 not received successfully by the network element's RLC/MAC receiver 135.

Additionally, the EGPRS system 100 implements the FANR feature to provide acknowledgment information with reduced latency. Without FANR, all acknowledgements of received RLC/MAC data blocks are sent using control messages, such as EGPRS packet downlink ACK/NACK control messages 145, packet uplink ACK/NACK control messages 165, etc. Such control messages do not include any RLC data, although they may include other RLC/MAC control information besides acknowledgement information. The disadvantage of using only control messages to send acknowledgement information is that such an approach can be quite inefficient, particularly when acknowledgement information needs to be sent quickly (e.g. in order to allow fast retransmissions of erroneously received blocks) or when the status of very few blocks needs to be indicated (e.g. in low bandwidth transmissions). In such scenarios, the amount of acknowledgement information that is actually useful is very small compared to the capacity of an RLC/MAC control message.

To reduce latency, the FANR feature allows acknowledgment information to be transmitted in a PAN field included with the transmission of an RLC/MAC data block. In the illustrated example of FIG. 1, acknowledgment information for reception of the downlink RLC/MAC data blocks 175 is included in a PAN field 185 transmitted with the corresponding uplink RLC/MAC data block 155. Similarly, acknowledgment information for reception of the uplink RLC/MAC data blocks 155 is included in a PAN field 190 transmitted with the corresponding downlink RLC/MAC data block 175. As specified by the EGPRS standards, the uplink PAN field 185 includes a reported bitmap (RB) field providing a set of acknowledgment bits, with each bit providing an ACK or NACK indication for a respective received data block being acknowledged by the RB. The uplink PAN field 185 also includes a starting sequence number (SSN) related to the block sequence number of the data block corresponding to the first data block included in the set of data blocks covered by the RB field. The uplink PAN field 185 further includes a beginning of window (BOW) field to indicate whether the SSN field indicates the identity of the data block corresponding to the beginning of the receive window maintained by the receiver providing the acknowledgment information.

As specified by the EGPRS standards, the downlink PAN field 190 can employ SSN-based encoding or time-based coding. In the case of SSN-based encoding, the downlink PAN field 190 includes an RB field, an SSN field and a BOW field as described above for the uplink PAN field 185. In the case of time-based encoding, the downlink PAN field 190 includes the RB field, with the particular blocks being acknowledged determined based on the time the downlink PAN field 190 is sent.

In general, it is expected that acknowledgment information provided by a PAN field is less reliable than the acknowledgment information provided by a packet ACK/NACK control message. The reduced reliability of the PAN field generally results from less error detection and correction, less robust encoding, or both, being employed for the PAN field than for a control message. Because of a resulting higher probability of false positive detections, PAN fields are generally treated with caution to avoid the possibility of any serious failure arising in case of such a false positive detection. For example, as a result of false positive decoding of a PAN, an RLC/MAC transmitter may incorrectly believe that an RLC/MAC data block has been received successfully by its peer, thereby causing the transmitter to remove the block from its transmit buffer. To avoid such serious failures, a tentative acknowledgment state (referred to herein as a "TENTATIVE_ACK" state) is used to indicate that an ACK indication has been received via a PAN field, and not via a packet ACK/NACK control message, for a previously transmitted data block. Therefore, a transmitted RLC/MAC data block can be associated with at least the following four acknowledgment states: ACKED (positively acknowledged or positive acknowledgment), TENTATIVE_ACK (tentatively acknowledged or tentative acknowledgment), NACKED (negatively acknowledged or negative acknowledgment) or PENDING_ACK (pending acknowledgment or pending acknowledgment, that is, no acknowledgment information has as yet been received for this data block).

As mentioned above, an RLC/MAC transmitter generally cannot move its associated transmit window until the oldest block in the window is associated with an ACKED state (i.e., until there is confirmation that the oldest block has been received). Thus, in at least some configurations, the mobile station's RLC/MAC transmitter 115 will retransmit uplink RLC/MAC data blocks 155 having a TENTATIVE_ACK state when a corresponding uplink physical data channel 160 has been allocated to the mobile station 105, but the mobile station has no other data blocks to send (e.g., such as no new data blocks or previously transmitted data blocks associated with the NACKED or PENDING_ACK states). Even though these TENTATIVE_ACK blocks have likely been received by the network element's RLC/MAC receiver 135, the mobile station's RLC/MAC transmitter 115 will continue transmitting such TENTATIVE_ACK blocks when there is no other data to send until a packet uplink ACK/NACK control message 165 confirming acknowledgment of the TENTATIVE_ACK blocks is received (thereby allowing these blocks to be associated with an ACKED state and allowing the transmit window maintained by the mobile station's RLC/MAC transmitter 115 to be incremented).

During typical FANR operation in the EGPRS system 100, the network element 110 will poll the mobile system 105 to provide downlink acknowledgment information in the PAN field 185 accompanying a subsequent uplink RLC/MAC data block 155 until the network element 110 needs to move its transmit window (e.g., to allow transmitted downlink blocks NACK'ed by the mobile station to be quickly retransmitted). Then, to allow its transmit window to move, the network element 110 will poll the mobile system 105 to provide downlink acknowledgment information in a separate EGPRS packet downlink ACK/NACK control message 145 (e.g. to allow confirmation of previously transmitted blocks associated with a TENTATIVE_ACK state). Furthermore, when the mobile system 105 is polled to provide downlink acknowledgment information in the PAN field 185, but the mobile station 105 has no uplink RLC/MAC data blocks 155 to send, the mobile station 105 can respond to the poll with a packet downlink ACK/NACK control message 145, thereby providing early confirmation of the downlink data blocks and allowing the network element 110 to advance its transmit window.

However, even if the only remaining uplink data block to transmit is a block having a TENTATIVE_ACK state, a conventional EGPRS mobile station is required to resend this TENTATIVE_ACK block with an accompanying PAN field in response to the poll for a PAN, even though the TENTATIVE_ACK block has likely been already received by the network. Such a retransmission of the TENTATIVE_ACK block has little benefit, especially since the TENTATIVE_ACK block has likely been already received by the network and the network cannot advance its transmit window based on acknowledgment information received only via a PAN. In contrast, the mobile station 105 of the illustrated example employs transmission prioritization in which the mobile station's RLC/MAC transmitter 115 can send the packet downlink ACK/NACK control message 145 to the network element 110 in response to a poll for PAN when the mobile station has only uplink RLC/MAC data blocks 155 associated with a TENTATIVE_ACK state remaining to be resent to the network. By not requiring retransmission of these TENTATIVE_ACK blocks in this case, the mobile station 105 can send the packet downlink ACK/NACK control message 145 to the network element 110 earlier than in a conventional implementation. Sending the packet downlink ACK/NACK control message 145 instead of the PAN 185 yields substantial benefits, such as providing more acknowledgment information than can be provided in a PAN and confirming acknowledgment of any previous downlink RLC/MAC blocks 175 sent to the mobile station, thereby allowing the network element 110 to advance its transmit window earlier than in a conventional implementation. An example implementation of the mobile station 105 depicting support of such transmission prioritization is illustrated in FIG. 2 and described in greater detail below.

Figure 3:
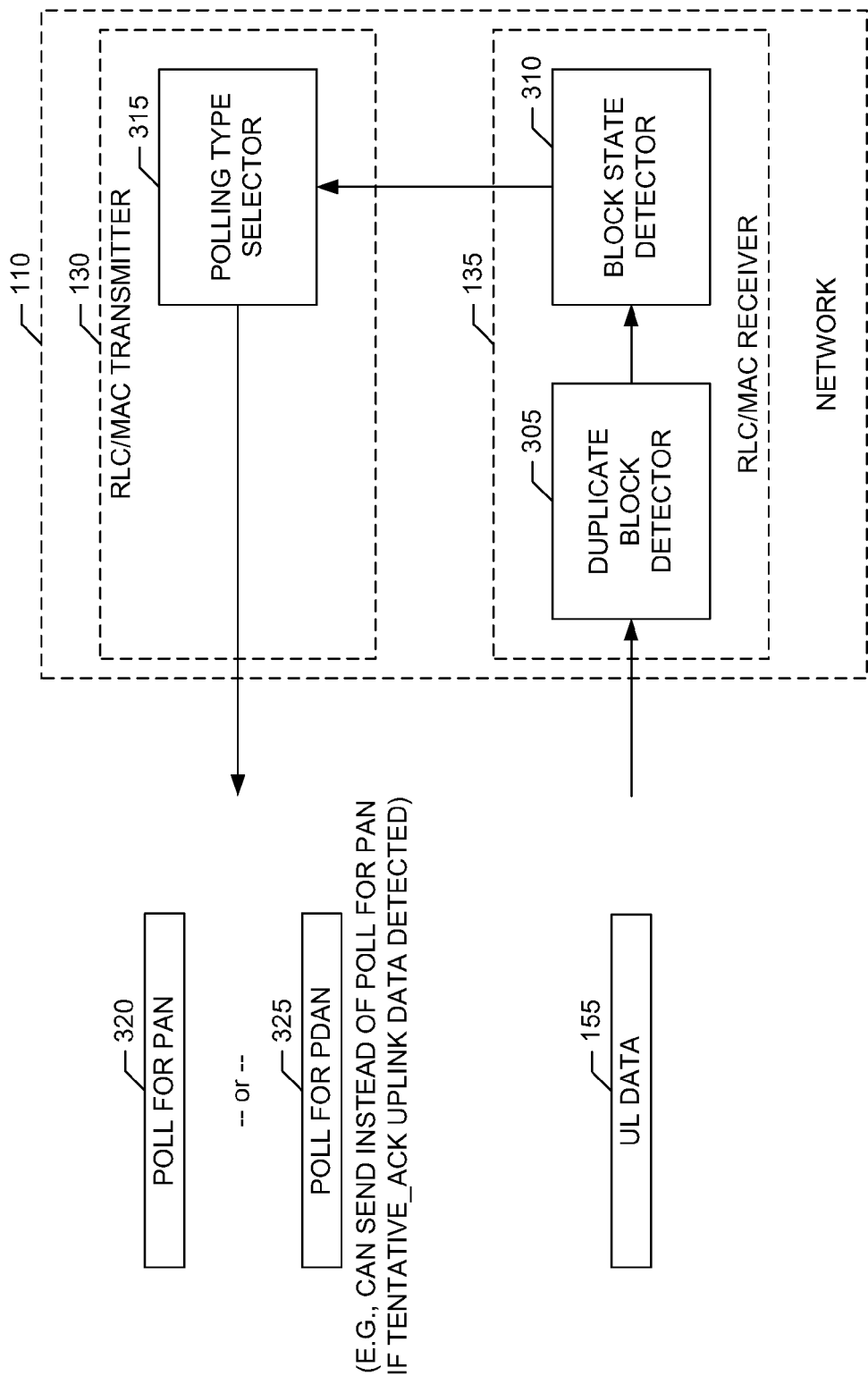
FIG. 3 is a block diagram of an example network element enabling mobile station transmission prioritization according to the methods and apparatus described herein that may be used in the example EGPRS communication system of FIG. 1.

The network element 110 of FIG. 1 also supports a mobile station transmission prioritization scheme that can be achieved even with conventional mobile stations. For example, the network element 110 operates to determine whether a received uplink RLC/MAC data block 155 is a duplicate of a previously received data block. Then, using one or more techniques described in greater detail below, the network element 110 infers whether the received duplicate uplink RLC/MAC data block 155 is associated with a TENTATIVE_ACK state at the mobile station 105, or some other state (e.g., such as a PENDING_ACK state). If the network element 110 infers that the duplicate uplink RLC/MAC data block 155 is associated with a TENTATIVE_ACK state at the mobile station 105 and, thus, the mobile station 105 has only TENTATIVE_ACK blocks to send, the network element 110 replaces any poll for a PAN intended to be sent to the mobile station 105 with a poll for a packet downlink ACK/NACK control message 145. Such a procedure indirectly causes the mobile station 105 to implement the transmission prioritization described above. An example implementation of the network element 110 depicting support of such transmission prioritization is illustrated in FIG. 3 and described in greater detail below.

Although the example transmission prioritization methods and apparatus disclosed herein are described in the context of the EGPRS system 100 of FIG. 1, these example methods and apparatus can be readily adapted for use in any communication system in which acknowledgment information can be provided via a control message and, alternatively, via transmission in a field accompanying a data block. Furthermore, due the symmetry of the RLC/MAC transmitters and receivers included in the mobile station 105 and the network element 110, although the example methods and apparatus disclosed herein are described from the perspective of implementation by the mobile station 105, the disclosed example methods and apparatus could also be implemented by the network element 110.

Figure 2:
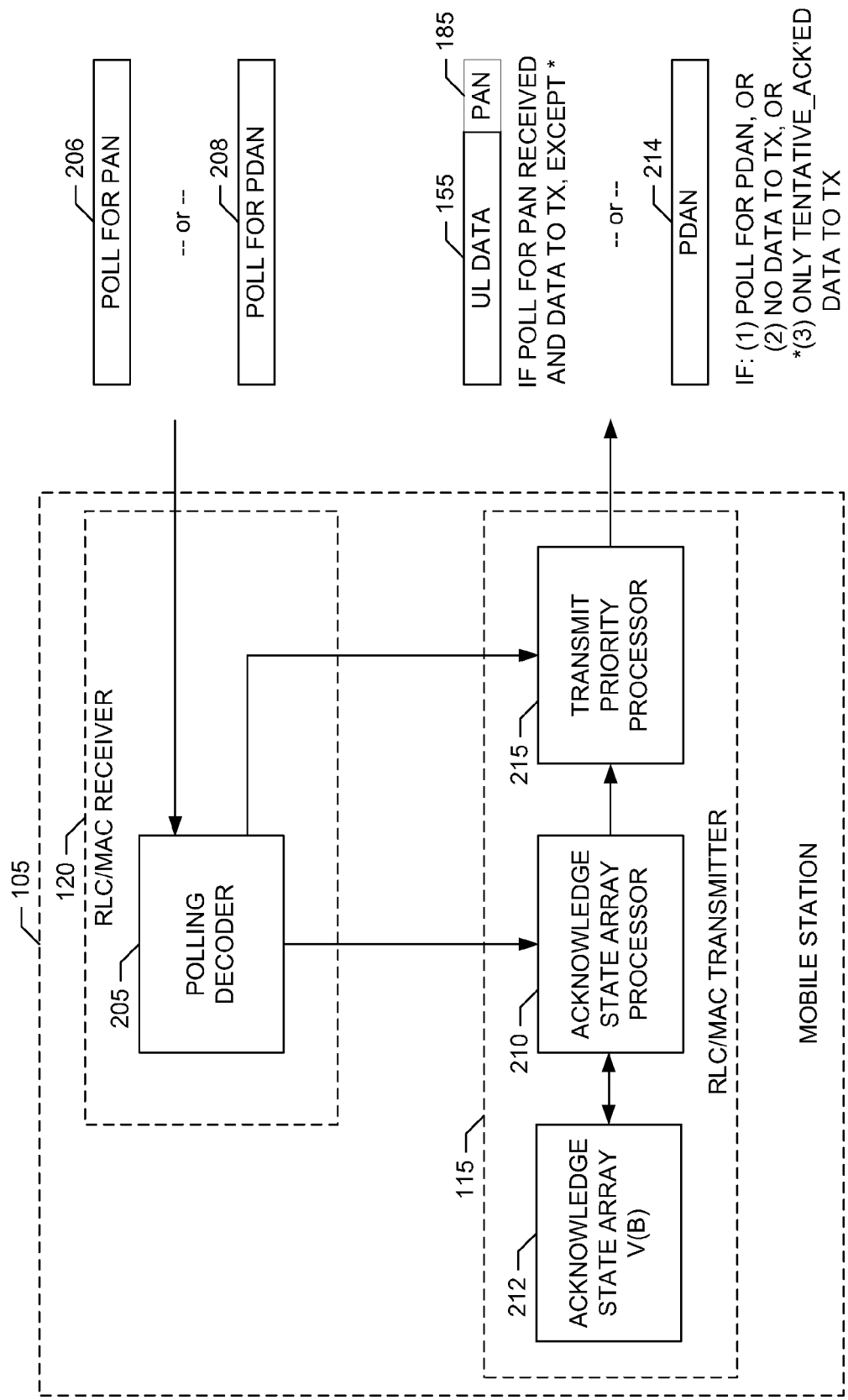
FIG. 2 is a block diagram of an example mobile station employing transmission prioritization according to the methods and apparatus described herein that may be used in the example EGPRS communication system of FIG. 1.

A block diagram of an example implementation of the mobile station 105 included in the EGPRS system 100 of FIG. 1 is illustrated in FIG. 2. In particular, FIG. 2 illustrates example implementations of the mobile station's RLC/MAC transmitter 115 and the mobile station's RLC/MAC receiver 120. In the illustrated example of FIG. 2, the mobile station's RLC/MAC receiver 120 includes a polling decoder 205 to decode polling messages received from a network element (e.g., such as the network element 110) requesting that the mobile system 105 provide acknowledgment information for downlink data blocks (e.g., such as the downlink RLC/MAC data block 175) previously transmitted by the network. For example, to implement the EGPRS FANR feature, the polling decoder 205 may decode a received poll for PAN message 206 requesting that the mobile system 105 provide such acknowledgment information in a PAN field (e.g., such as the PAN field 185) accompanying uplink data blocks (e.g., such as the uplink RLC/MAC data blocks 155) to be transmitted to the network. As another example, the polling decoder 205 may decode a received poll for PDAN message 208 requesting that the mobile system 105 provide such acknowledgment information in a separate EGPRS packet downlink ACK/

NACK control message (e.g., such as the EGPRS packet downlink ACK/NACK control message 145).

In the illustrated example of FIG. 2, the mobile station's RLC/MAC transmitter 115 includes an acknowledge state array processor 210 to process an acknowledge state array 212 (designated also as "V(B)" herein) storing acknowledgment states for a set of previously transmitted uplink data blocks (e.g., such as the uplink RLC/MAC data blocks 155). During a current processing interval, the example acknowledge state array processor 210 updates and processes a set of acknowledge state array elements in V(B) corresponding to those uplink data blocks in the current transmit window maintained by the mobile station's RLC/MAC transmitter 115. For example, the set of acknowledge state array elements in V(B) to be updated/processed starts at the transmit window's starting block sequence number, V(A), corresponding to the block sequence number of the oldest uplink data block not associated with an ACKED state, and extends to the block sequence number, V(S), of the next uplink data block to be transmitted, without extending past a specified window size, WS. During a particular processing iteration, the acknowledge state array processor 210 updates the acknowledgment state for any uplink data blocks for which acknowledgment information has been received, and then selects a next uplink data block for transmission by the mobile station's RLC/MAC transmitter 115.

For example, after updating the acknowledgment states stored in the acknowledge state array V(B), the acknowledge state array processor 210 processes the array V(B) and selects uplink data blocks associated with a NACKED state for retransmission. If no uplink data blocks are associated with a NACKED state, the acknowledge state array processor 210 selects the next available new (e.g., non-transmitted) uplink data block for transmission (assuming that the transmit window has not stalled because a maximum number of uplink data blocks have been transmitted since an oldest uplink data block still not associated with an ACKED state). However, if there are also no new uplink data blocks (or the transmit window has stalled), the acknowledge state array processor 210 processes the array V(B) and selects uplink data blocks associated with a PENDING_ACK state for retransmission (because acknowledgment information has not yet been received for such previously transmitted uplink blocks). If, however, there are also no uplink data blocks associated with a PENDING_ACK state, the acknowledge state array processor 210 processes the array V(B) and selects uplink data blocks associated with a TENTATIVE_ACK state for retransmission (because acknowledgment of such previously transmitted blocks will need to be confirmed before the transmit window maintained by the mobile station's RLC/MAC transmitter 115 can be incremented). However, if there are also no uplink data blocks associated with a TENTATIVE_ACK state, the acknowledge state array processor 210 indicates that there are no uplink data blocks to be transmitted.

In the illustrated example, the acknowledge state array processor 210 also obtains a polling for PAN indication from the polling decoder 205 when the requested polling type is a poll for a PAN (e.g., corresponding to a received poll for PAN message 206). If the polling for PAN indication is received from the polling decoder 205, and the acknowledge state array processor 210 has selected a new uplink data block or a previously transmitted uplink data block associated with either a NACKED state or a PENDING_ACK state for transmission, the acknowledge state array processor 210 maintains its selection of which uplink data block is to be transmitted with the requested PAN field. However, if the acknowledge state array processor 210 has selected a previously transmitted uplink data block associated with a TENTATIVE_ACK state, the acknowledge state array processor 210 revises its selection to indicate that there are no uplink data blocks to be transmitted. As described in greater detail below, by indicating that there are no uplink blocks to be transmitted, the mobile station's RLC/MAC transmitter 115 will transmit a separate EGPRS packet downlink ACK/NACK control message 214 in response to the network's poll for PAN message 206, instead of retransmitting the uplink data block associated with a TENTATIVE_ACK state as an uplink RLC/MAC data block 155 with a PAN field 185. Alternatively, the acknowledge state array processor 210 could maintain its selection of the uplink data block associated with a TENTATIVE_ACK state, but indicate that the selected block is associated with a TENTATIVE_ACK state to allow subsequent processing to determine that a separate EGPRS packet downlink ACK/NACK control message 214, instead of the TENTATIVE_ACK block and PAN combination 155/185, can be sent in response to the network's poll for a PAN.

The RLC/MAC transmitter 115 included in the mobile station 105 of FIG. 2 also includes a transmit priority processor 215 to prioritize uplink transmissions. In general, the example transmit priority processor 215 prioritizes transmission of most RLC/MAC control messages over transmission of RLC/MAC data blocks (including any accompanying PAN fields). However, the transmit priority processor 215 also obtains a polling for PAN indication from the polling decoder 205 and treats uplink transmissions in response to a network poll for a PAN as a special case. For example, if the transmit priority processor 215 obtains a polling for PAN indication and the acknowledge state array processor 210 has selected a next block for transmission that is not associated with a TENTATIVE_ACK state, then the transmit priority processor 215 allows the selected uplink data block, along with the requested PAN field, to be transmitted as an uplink RLC/MAC data block and PAN field combination 155/185 with the normal priority associated with transmission of RLC/MAC data blocks. However, if the acknowledge state array processor 210 has selected a next block for transmission that is associated with a TENTATIVE_ACK state, or the acknowledge state array processor 210 indicates that there are no uplink blocks to be transmitted, the transmit priority processor 215 causes transmission of a separate EGPRS packet downlink ACK/NACK control message 214 in response to the network's poll for PAN message 206, instead of retransmitting the uplink data block associated with a TENTATIVE_ACK state with a PAN field. Such operation achieves the mobile station transmission prioritization described above, along with the benefits associated with not transmitting a TENTATIVE_ACK block in response to a poll for a PAN.

At least some example implementations can extend the transmission prioritization further to cause PENDING_ACK blocks to not be transmitted in response to a poll for PAN message 206. In such an example, if the poll for PAN message 206 is received and the acknowledge state array processor 210 has selected an uplink data block associated with a PENDING_ACK state, the acknowledge state array processor 210 can revise its selection to indicate that there are no uplink data blocks to be transmitted. Additionally or alternatively, if the acknowledge state array processor 210 has selected a next block for transmission that is associated with a PENDING_ACK state, the transmit priority processor 215 can cause transmission of a separate EGPRS packet downlink ACK/NACK control message 214 in response to the network's poll for PAN message 206, instead of retransmitting the uplink data block associated with a PENDING_ACK state with a PAN field.

While an example manner of implementing the example mobile station 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example RLC/MAC transmitter 115, the example RLC/MAC receiver 120, the example polling decoder 205, the example acknowledge state array processor 210, the example transmit priority processor 215 and/or, more generally, the example mobile station 105 of FIG. 2 may be implemented by hardware, software, firmware and/or any combination of hardware, software and/or firmware. Thus, for example, any of the example RLC/MAC transmitter 115, the example RLC/MAC receiver 120, the example polling decoder 205, the example acknowledge state array processor 210, the example transmit priority processor 215 and/or, more generally, the example mobile station 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example mobile station 105, the example RLC/MAC transmitter 115, the example RLC/MAC receiver 120, the example polling decoder 205, the example acknowledge state array processor 210 and/or the example transmit priority processor 215 are hereby expressly defined to include a tangible medium such as a memory, digital versatile disk (DVD), compact disk (CD), etc., storing such software and/or firmware. Further still, the example mobile station 105 of FIG. 2 may include one or more elements, processes and/or devices in addition to, or instead of, those illustrated in FIG. 2, and/or may include more than one of any or all of the illustrated elements, processes and devices.

A block diagram of an example implementation of the network element 110 included in the EGPRS system 100 of FIG. 1 is illustrated in FIG. 3. In particular, FIG. 3 illustrates example implementations of the network element's RLC/MAC transmitter 130 and the network element's RLC/MAC receiver 135. In the illustrated example of FIG. 3, the network element's RLC/MAC receiver 135 includes a duplicate block detector 305 to detect whether a received uplink data block (e.g., such as a received uplink RLC/MAC data block 155) is a duplicate of a previously received uplink data block. For example, the duplicate block detector 305 can compare block sequence numbers included in the current and previously received uplink data blocks to determine whether the blocks are duplicates. If a received uplink data block is determined to be a duplicate of a previously transmitted uplink block, the example duplicate block detector 305 outputs an indication that the received uplink data block is a retransmitted uplink data block.

The RLC/MAC receiver 135 included in the network element of FIG. 3 also includes a block state detector 310 to infer whether a retransmitted uplink data block identified by the duplicate block detector 305 is associated with a TENTATIVE_ACK state by the mobile station (e.g., such as the mobile station 105) that transmitted the received retransmitted uplink data block. In an example implementation, the block state detector 310 infers that the mobile station has associated the retransmitted uplink data block with a TENTATIVE_ACK state when an elapsed time between receipt of the duplicate previous uplink data block and receipt of the current uplink data block has met or exceeded a threshold elapsed time. In other words, the more time that has elapsed between transmission of a first block and a second duplicate block, the more likely the second duplicate block is associated with a TENTATIVE_ACK state at the transmitter. In another example implementation, the block state detector 310 additionally or alternatively infers that the mobile station has associated the retransmitted uplink data block with a TENTATIVE_ACK state when a number of positive acknowledgments of the previously received duplicate data block sent by the network to the mobile (e.g., via PAN fields) has met or exceeded a threshold number of acknowledgments. In other words, the more times that a first block has already been acknowledged, the more likely a second duplicate block is associated with a TENTATIVE_ACK state at the transmitter.

Additionally, in good radio conditions, a previously transmitted uplink data block will be associated with a TENTATIVE_ACK state at the mobile station as soon as the mobile station has received a PAN field having an ACK indication for that uplink block. However, in poor radio conditions, the mobile station may not receive and decode correctly the PAN field from the network element 110. Therefore, the network element 110 may also take into account radio conditions when determining that a received duplicate data block is associated with a TENTATIVE_ACK state at the mobile station.

In the illustrated example of FIG. 3, the block state detector 310 provides an indication of a probability that the retransmitted uplink data block is associated with a TENTATIVE_ACK state to a polling type selector 315 included in the network element's RLC/MAC transmitter 130. The example polling type selector 315 determines whether a pending poll for a PAN (e.g., illustrated as a poll for PAN message 320) destined for transmission to the mobile station that transmitted the received retransmitted uplink data block should be replaced with a different polling request, such as a poll for an EGPRS packet downlink ACK/NACK control message (e.g., illustrated as a poll for PDAN message 325). For example, if the polling type selector 315 obtains an indication from the block state detector 310 that the retransmitted uplink data block is, with high probability, not associated with a TENTATIVE_ACK state, the polling type selector 315 maintains the pending poll for a PAN destined for transmission to the mobile station. However, if the polling type selector 315 obtains an indication from the block state detector 310 that the retransmitted uplink data block is, with high probability, associated with a TENTATIVE_ACK state (e.g., indicating that the mobile station has only TENTATIVE_ACK blocks to send), the polling type selector 315 replaces the pending poll for a PAN with a poll for a packet downlink ACK/NACK control message. Such operation indirectly causes the mobile station to implement the transmission prioritization described above While an example manner of implementing the example network element 110 of FIG. 1 has been illustrated in FIG. 3, one or more of the elements, processes and/or devices illustrated in FIG. 3 may be combined, divided, re-arranged, omitted, eliminated and/or implemented in any other way. Further, the example RLC/MAC transmitter 130, the example RLC/MAC receiver 135, the example duplicate block detector 305, the example block state detector 310, the example polling type selector 315 and/or, more generally, the example network element 110 of FIG. 3 may be implemented by hardware, software, firmware and/or any combination of hardware, software and/or firmware. Thus, for example, any of the example RLC/MAC transmitter 130, the example RLC/MAC receiver 135, the example duplicate block detector 305, the example block state detector 310, the example polling type selector 315 and/or, more generally, the example network element 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example network element 110, the example RLC/MAC transmitter 130, the example RLC/MAC receiver 135, the example duplicate block detector 305, the example block state detector 310 and/or the example polling type selector 315 are hereby expressly defined to include a tangible medium such as a memory, digital versatile disk (DVD), compact disk (CD), etc., storing such software and/or firmware. Further still, the example network element 110 of FIG. 3 may include one or more elements, processes and/or devices in addition to, or instead of, those illustrated in FIG. 3, and/or may include more than one of any or all of the illustrated elements, processes and devices.

Figure 4:
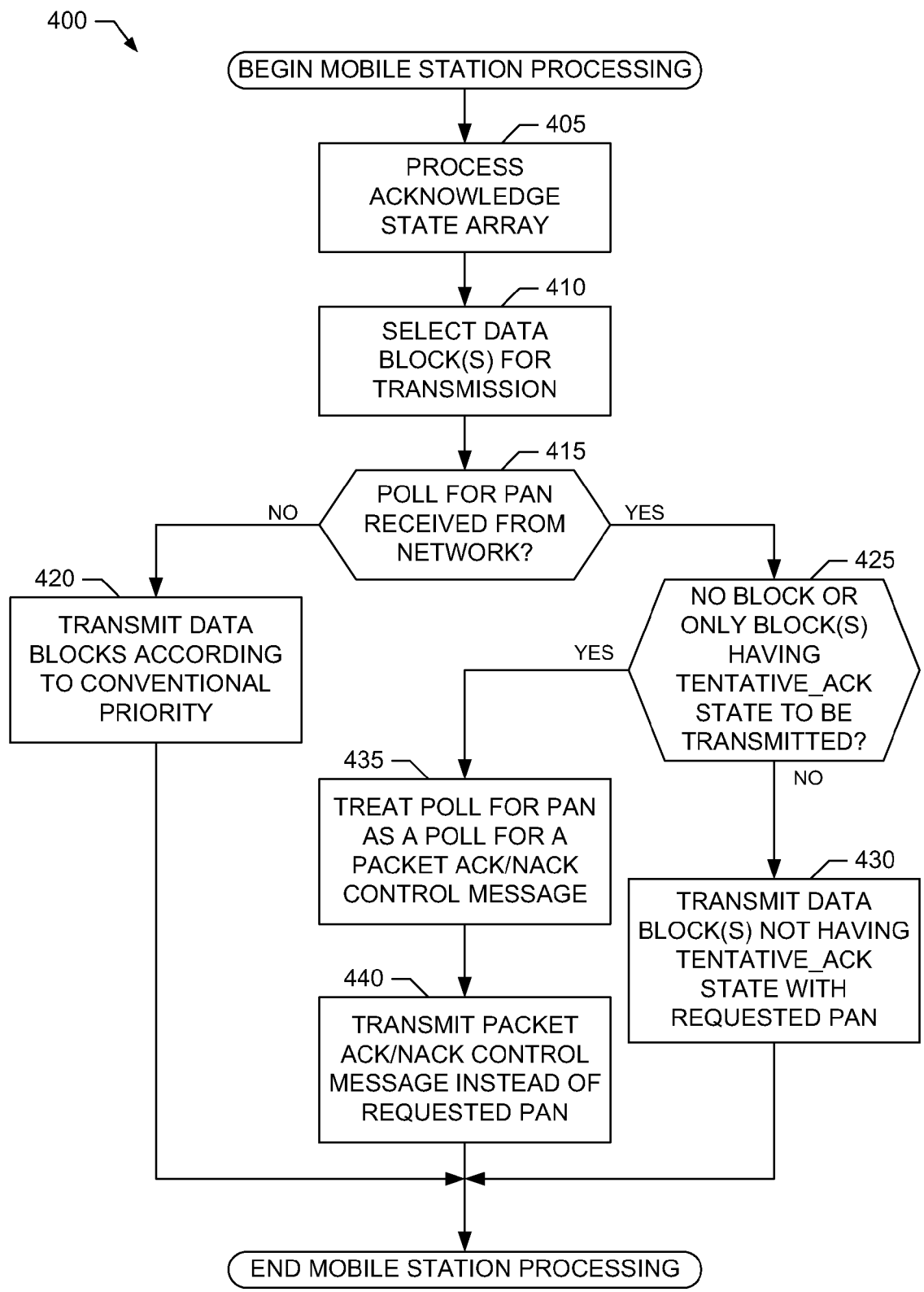
FIG. 4 is a flowchart representative of an example process that may be performed to implement the example mobile station of FIG. 2.
Figure 5:
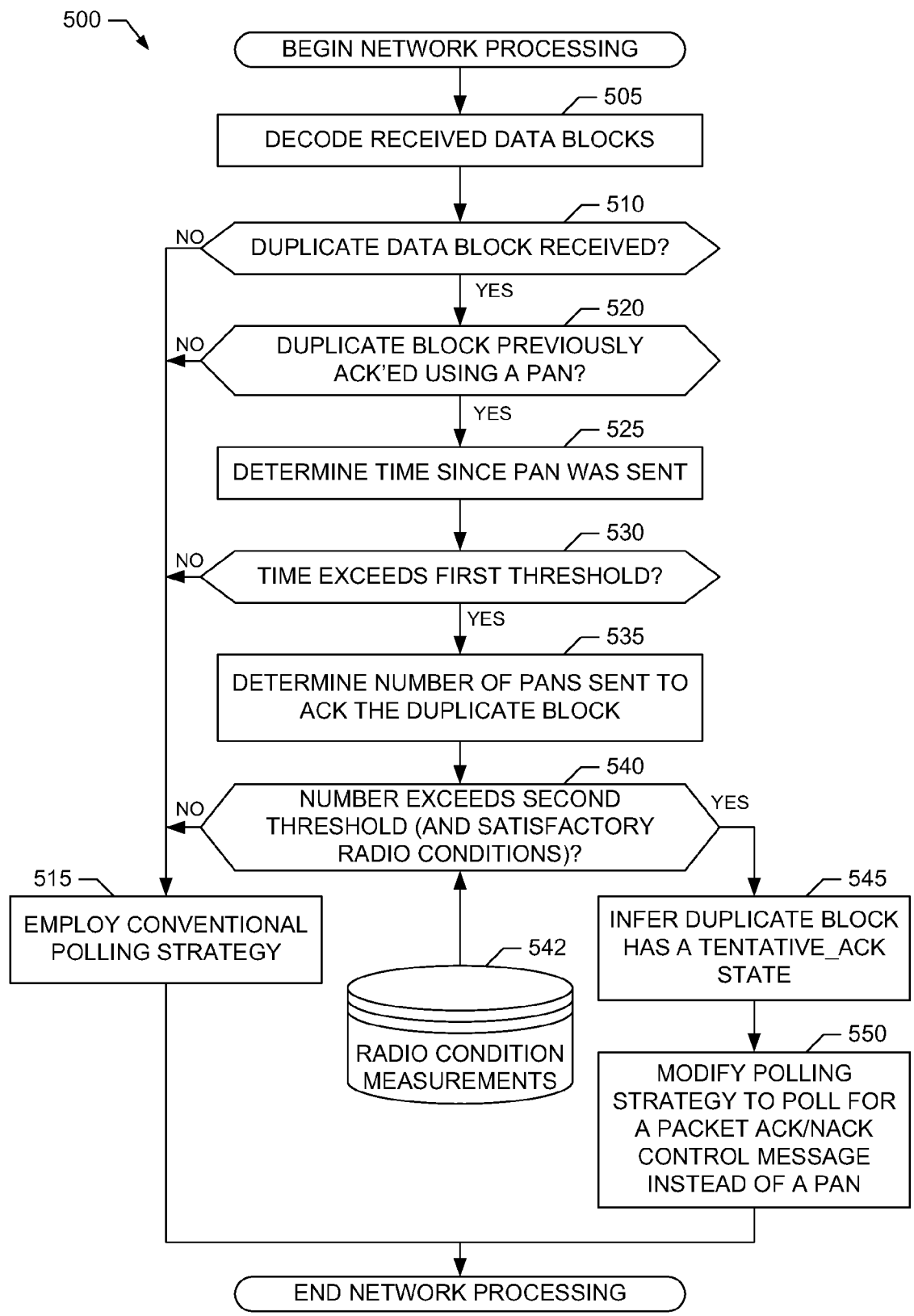
FIG. 5 is a flowchart representative of an example process that may be performed to implement the example network element of FIG. 3.

Flowcharts representative of example processes that may be executed to implement any, some or all of the example EGPRS communication system 100, the example mobile station 105, the example network element 110, the example RLC/MAC transmitter 115, the example RLC/MAC receiver 120, the example RLC/MAC transmitter 130, the example RLC/MAC receiver 135, the example polling decoder 205, the example acknowledge state array processor 210, the example transmit priority processor 215, the example duplicate block detector 305, the example block state detector 310 and the example polling type selector 315 are shown in FIGS. 4-5.

In these examples, the process represented by each flowchart may be implemented by one or more programs comprising machine readable instructions for execution by: (a) a processor, such as the processor 612 shown in the example processing system 600 discussed below in connection with FIG. 6, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 612, but the entire program or programs and/or portions thereof could alternatively be executed by a device other than the processor 612 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example EGPRS communication system 100, the example mobile station 105, the example network element 110, the example RLC/MAC transmitter 115, the example RLC/MAC receiver 120, the example RLC/MAC transmitter 130, the example RLC/MAC receiver 135, the example polling decoder 205, the example acknowledge state array processor 210, the example transmit priority processor 215, the example duplicate block detector 305, the example block state detector 310 and the example polling type selector 315 could be implemented by any combination of software, hardware, and/or firmware. Also, some or all of the processes represented by the flowcharts of FIGS. 4-5 may be implemented manually.

Further, although the example processes are described with reference to the flowcharts illustrated in FIGS. 4-5, many other techniques for implementing the example methods and apparatus described herein may alternatively be used. For example, with reference to the flowcharts illustrated in FIGS. 4-5, the order of execution of the blocks may be changed, and/or some of the blocks described may be changed, eliminated, combined and/or subdivided into multiple blocks.

An example process 400 that may be executed to implement transmission prioritization processing in the example mobile unit 105 of FIG. 1 or 2, or both, is illustrated in FIG. 4. The process 400 may be executed at predetermined intervals (e.g., such as prior to a next uplink data transmission interval), based on an occurrence of a predetermined event (e.g., such as receipt of a polling message from a network element), as a background process, etc., or any combination thereof. With reference to FIGS. 1 and 2, the process 400 of FIG. 4 begins execution at block 405 at which the acknowledge state array processor 210 included in the mobile station 105 updates the acknowledgment states stored in the acknowledge state array V(B) for the transmitted uplink RLC/MAC data blocks 155 included in the mobile station's current transmit window. For example, at block 405 the acknowledge state array processor 210 updates the acknowledgment state stored in V(B) for any uplink data blocks for which acknowledgment information has been received since a previous update.

Next, control proceeds to block 410 at which the acknowledge state array processor 210 included in the mobile station 105 selects one or more next uplink data blocks for transmission by the mobile station's RLC/MAC transmitter 115. For example, and as described in greater detail above in connection with FIG. 2, at block 410 the acknowledge state array processor 210 selects uplink data blocks for transmission in the following order of priority: (1) uplink blocks associated with a NACKED state, (2) new uplink data blocks (assuming the transmit window has not stalled), (3) uplink blocks associated with a PENDING_ACK state and (4) uplink blocks associated with a TENTATIVE_ACK state. After the next uplink data block to be transmitted is selected at block 410, control proceeds to block 415.

At block 415, the polling decoder 205 included in the mobile station 105 determines whether a poll for a PAN has been received from the network element 110. If a poll for a PAN has not been received (block 415), control proceeds to block 420 at which the transmit priority processor 215 included in the mobile station 105 transmits the uplink data block selected at block 410 according to a conventional prioritization, such as prioritizing most uplink RLC/MAC control messages over transmission of uplink RLC/MAC data blocks (including any accompanying PAN fields). After processing at block 420 completes, execution of the process 400 ends.

However, if a poll for a PAN has been received (block 415), control proceeds to block 425 at which the transmit priority processor 215 included in the mobile station 105 determines whether only uplink data block(s) having a TENTATIVE_ACK state have been selected for transmission at block 410. If a block not having a TENTATIVE_ACK state has been selected for transmission (block 425), control proceeds to block 430 at which the transmit priority processor 215 causes the selected uplink data block to be transmitted as an uplink data block 155 along with a PAN field 185 as requested by the network element 110 according to a conventional prioritization, such as prioritizing most uplink RLC/MAC control messages over transmission of uplink RLC/MAC data blocks (including any accompanying PAN fields). After processing at block 430 completes, execution of the process 400 ends.

If, however, a block having a TENTATIVE_ACK state has been selected for transmission (block 425), or if no uplink data blocks have been selected for transmission, control proceeds to block 435 at which the transmit priority processor 215 included in the mobile station 105 treats the poll for a PAN received from the network element 110 as a poll for an EGPRS packet downlink ACK/NACK control message. Next, control proceeds to block 440 at which the transmit priority processor 215 causes the mobile station's RLC/MAC transmitter 115 to transmit an EGPRS packet downlink ACK/NACK control message 145 instead of the selected TENTATIVE_ACK data block along with the requested PAN. After processing at block 440 completes, execution of the process 400 ends.

An example process 500 that may be executed to implement mobile station transmission prioritization processing in the example network element 110 of FIG. 1 or 3, or both, is illustrated in FIG. 5. The process 500 may be executed at predetermined intervals (e.g., such as at regular downlink data transmission intervals), based on an occurrence of a predetermined event (e.g., such as prior to transmission of a polling request), as a background process, etc., or any combination thereof. With reference to FIGS. 1 and 3, the process 500 of FIG. 5 begins execution at block 505 at which the duplicate block detector 305 included in the network element 110 decodes a current uplink RLC/MAC data block 155 received from the mobile station 105. Next, at block 510 the duplicate block detector 305 determines whether the currently received uplink data block is a duplicate of a previously received uplink data block. If the currently received uplink data block is not a duplicate of a previously received uplink data block (block 510), control proceeds to block 515 at which the polling type selector 315 included in the network element 110 employs any appropriate polling strategy to send a next polling request to the mobile station 105. After processing at block 515 completes, execution of the procedure 500 ends.

However, if the currently received uplink data block is a duplicate of a previously received uplink data block (block 510), the duplicate block detector 305 included in the network element 110 indicates that the currently received uplink data block is a retransmitted uplink data block. Control then proceeds to block 520 at which the block state detector 310 included in the network element 110 determines whether the retransmitted uplink data block was previously acknowledged in a PAN sent to the mobile station 105. If the retransmitted uplink data block was previously acknowledged in a PAN (block 520), control proceeds to block 515 at which the polling type selector 315 included in the network element 110 employs any appropriate polling strategy to send a next polling request to the mobile station 105. After processing at block 515 completes, execution of the procedure 500 ends.

However, if the retransmitted uplink data block was previously acknowledged in a PAN (block 520), control proceeds to block 525 at which the block state detector 310 included in the network element 110 determines an elapsed time since a previous PAN was sent to acknowledge the received retransmitted uplink data block. Then, at block 525 the block state detector 310 determines whether the elapsed time since sending the previous PAN exceeds a first threshold (e.g., an elapsed time threshold). If the elapsed time does not exceed the first threshold (block 530), control proceeds to block 515 at which the network element 110 employs any appropriate polling strategy to send a next polling request to the mobile station 105.

If, however, the elapsed time does exceed the first threshold (block 530), control proceeds to block 535 at which the block state detector 310 determines how many PANs were previously sent to acknowledge the received retransmitted uplink data block. Then, at block 540 the block state detector 310 determines whether the number of previously sent PANs exceeds a second threshold (e.g., a number of PANs threshold). Optionally, at block 540 the block state detector 310 determines whether radio conditions are satisfactory such that the mobile station 105 has likely received and correctly decoded any PANs sent by the network element 110. In such an example, the block state detector 310 evaluates the radio conditions at block 540 based on one or more radio condition measurements performed or obtained, or both, at block 542. If the number of PANs does not exceed the second threshold (block 540), or if radio conditions are unsatisfactory in example implementations in which radio conditions are evaluated, control proceeds to block 515 at which the network element 110 employs any appropriate polling strategy to send a next polling request to the mobile station 105. After processing at block 515 completes, execution of the procedure 500 ends.

However, if the number of PANs previously sent to acknowledge the received retransmitted uplink data block does exceed the second threshold (block 540), and if radio conditions are satisfactory in example implementations in which radio conditions are evaluated, control proceeds to block 545. At block 545, the block state detector 310 infers that the mobile station 105 has associated the received retransmitted uplink data block with a TENTATIVE_ACK. Then, at block 550 the polling type selector 315 included in the network element 110 replaces any pending poll for a PAN that is destined for the mobile station 105 with a poll for a packet downlink ACK/NACK control message. After processing at block 550 completes, execution of the process 500 ends.

Figure 6:
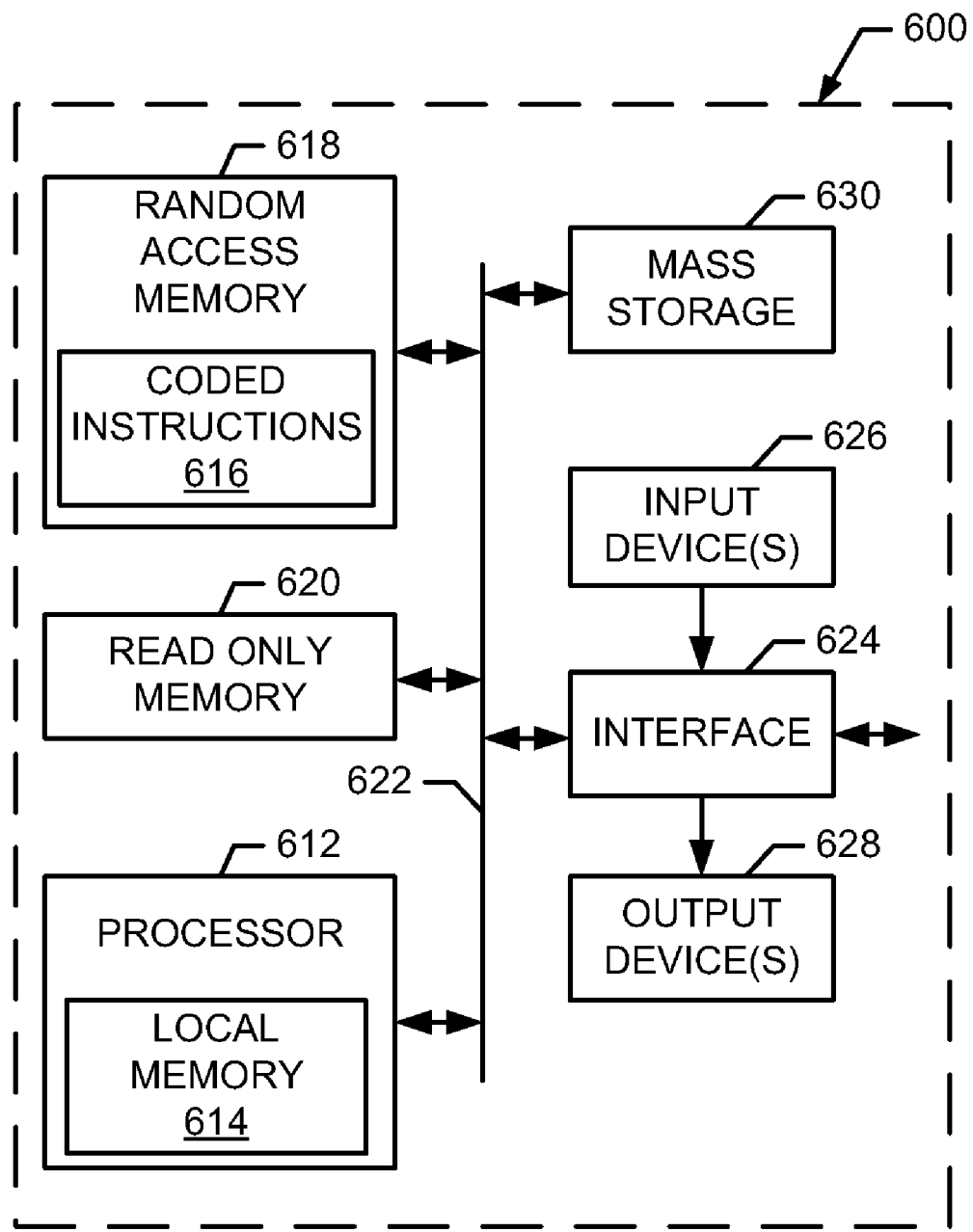
FIG. 6 is a block diagram of an example processing system that may store and execute example machine readable instructions used to implement some or all of the processes of FIG. 4 or 5, or both, to implement the example mobile station of FIG. 2, the example network element of FIG. 3, the example EGPRS communication system of FIG. 1, or any combination thereof.

FIG. 6 is a block diagram of an example processing system 600 capable of implementing the apparatus and methods disclosed herein. The processing system 600 can correspond to, for example, a mobile station processing platform, a network element processing platform, a server, a personal computer, a personal digital assistant (PDA), an Internet appliance, a mobile phone, or any other type of computing device.

The system 600 of the instant example includes a processor 612 such as a general purpose programmable processor, an embedded processor, a microcontroller, etc. The processor 612 includes a local memory 614, and executes coded instructions 616 present in the local memory 614 and/or in another memory device. The processor 612 may execute, among other things, machine readable instructions to implement the processes represented in FIGS. 4-5. The processor 612 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown).

The computer 600 also includes an interface circuit 624. The interface circuit 624 may be implemented by any type of interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices (e.g., a liquid crystal display, a cathode ray tube display (CRT)), by a printer and/or by speakers. The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The computer 600 also includes one or more mass storage devices 630 for storing software and data. Examples of such mass storage devices 630 include floppy disk drives, hard drive disks, compact disk drives and digital versatile disk (DVD) drives. The mass storage device 630 may store the acknowledge state array V(B) processed by the acknowledge state array processor 210. Alternatively, the volatile memory 618 may store the acknowledge state array V(B) processed by the acknowledge state array processor 210.

As an alternative to implementing the methods and/or apparatus described herein in a system such as the device of FIG. 6, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method in a mobile station, the method comprising:
   receiving a poll from a network, the poll requesting piggy-backed ACK/NACK (PAN) information; and
   transmitting a control message in response to the poll if a previously transmitted data block is associated with a tentative acknowledgment state, the control message including acknowledgment information.

2. The method of claim 1, wherein the control message is an enhanced general packet radio service (EGPRS) packet downlink ACK/NACK control message.

3. The method of claim 2, wherein the control message is transmitted instead of transmitting a PAN field with the previously transmitted data block associated with the tentative acknowledgement state.

4. The method of claim 3, further comprising associating the previously transmitted data block with the tentative acknowledgment state after a positive acknowledgment for the previously transmitted data block is received in a PAN field.

5. The method of claim 3, further comprising storing acknowledgment information associated with a set of data blocks previously transmitted by the mobile station in an acknowledge state array, each element of the acknowledge state array associated with a respective data block in the set of data blocks and to store an acknowledgment state associated with the respective data block, the acknowledgment state corresponding to at least one of a positive acknowledgment state, a negative acknowledgment state, a pending acknowledgment or the tentative acknowledgment state, wherein the previously transmitted data block is included in the set of data blocks.

6. The method of claim 5, wherein each other data block in the set of data blocks is associated with one of the positive acknowledgment state or the tentative acknowledgment state.

7. The method of claim 5, wherein the control message is sent in response to the poll if the previously transmitted data block is associated with the tentative acknowledgment state and each other data block in the set of data blocks is associated with one of the positive acknowledgment state or the tentative acknowledgment state.

8. The method of claim 5, wherein the next data block for transmission to the network is the previously transmitted data block associated with the tentative acknowledgement state.

9. The method of claim 8, further comprising processing the acknowledge state array to determine the next data block for transmission to the network.

10. The method of claim 5, further comprising processing the acknowledge state array to determine whether the previously transmitted data block is associated with the tentative acknowledgment state.

11. A mobile station comprising:
    a polling decoder to receive a poll from a network, the poll requesting piggy-backed ACK/NACK (PAN) information; and
    a transmit processor element to cause the mobile station to transmit a control message in response to the poll if a previously transmitted data block is associated with a tentative acknowledgment state, the control message including acknowledgment information.

12. A mobile station as defined in claim 11, wherein the control message is an enhanced general packet radio service (EGPRS) packet downlink ACK/NACK control message.

13. A mobile station as defined in claim 12, wherein the transmit processor element is configured to cause the mobile station to transmit the control message instead of transmitting a PAN field with the previously transmitted data block associated with the tentative acknowledgement state.

14. A mobile station as defined in claim 13, further comprising an acknowledge state array in memory and an acknowledge state array processor, the acknowledge state array processor to associate the previously transmitted data block with the tentative acknowledgment state after a positive acknowledgment for the previously transmitted data block is received in a PAN field.

15. A mobile station as defined in claim 14, wherein each element of the acknowledge state array stores an acknowledgment state associated with a respective previously transmitted data block in a transmit window maintained by the mobile station, the acknowledgment state corresponding to at least one of a positive acknowledgment state, a negative acknowledgment state, a pending acknowledgment or the tentative acknowledgment state, wherein the previously transmitted data block is included in the set of data blocks.

16. A mobile station as defined in claim 15, wherein each other data block in the set of data blocks is associated with one of the positive acknowledgment state or the tentative acknowledgment state.

17. A mobile station as defined in claim 15, wherein the control message is transmitted in response to the poll if the previously transmitted data block is associated with the tentative acknowledgment state and each other data block in the set of data blocks is associated with one of the positive acknowledgment state or the tentative acknowledgment state.

18. A mobile station as defined in claim 15, wherein the next data block for transmission to the network is the previously transmitted data block associated with the tentative acknowledgement state.

19. A mobile station as defined in claim 18, wherein the acknowledge state array processor is configured to determine the next data block for transmission to the network.

20. A mobile station as defined in claim 15, wherein the acknowledge state array processor is configured to determine whether the previously transmitted data block is associated with the tentative acknowledgment state.

21. A tangible article of manufacture storing machine readable instructions which, when executed, cause a machine to at least:
  receive a poll from a network, the poll requesting piggybacked ACK/NACK (PAN) information; and
  transmit a control message in response to the poll if a previously transmitted data block is associated with a tentative acknowledgment state, the control message including acknowledgment information.

22. A tangible article of manufacture as defined in claim 21, wherein the control message is an enhanced general packet radio service (EGPRS) packet downlink ACK/NACK control message.

23. A tangible article of manufacture as defined in claim 22, wherein the machine readable instructions, when executed, cause the machine to transmit the control message instead of transmitting a PAN field with the previously transmitted data block associated with the tentative acknowledgement state.

24. A tangible article of manufacture as defined in claim 23, wherein the machine readable instructions, when executed, further cause the machine to associate the previously transmitted data block with the tentative acknowledgment state after a positive acknowledgment for the previously transmitted data block is received in a PAN field.

25. A tangible article of manufacture as defined in claim 23, wherein the machine readable instructions, when executed, further cause the machine to store acknowledgment information associated with a set of data blocks previously transmitted by the mobile station in an acknowledge state array, each element of the acknowledge state array associated with a respective data block in the set of data blocks and to store an acknowledgment state associated with the respective data block, the acknowledgment state corresponding to at least one of a positive acknowledgment state, a negative acknowledgment state, a pending acknowledgment or the tentative acknowledgment state, wherein the previously transmitted data block is included in the set of data blocks.

26. A tangible article of manufacture as defined in claim 25, wherein each other data block in the set of data blocks is associated with one of the positive acknowledgment state or the tentative acknowledgment state.

27. A tangible article of manufacture as defined in claim 25, wherein the machine readable instructions, when executed, cause the machine to send the control message in response to the poll if the previously transmitted data block is associated with the tentative acknowledgment state and each other data block in the set of data blocks is associated with one of the positive acknowledgment state or the tentative acknowledgment state.

28. A tangible article of manufacture as defined in claim 25, wherein the next data block for transmission to the network is the previously transmitted data block associated with the tentative acknowledgement state.

29. A tangible article of manufacture as defined in claim 28, wherein the machine readable instructions, when executed, cause the machine to process the acknowledge state array to determine the next data block for transmission to the network.

30. A tangible article of manufacture as defined in claim 25, wherein the machine readable instructions, when executed, cause the machine to process the acknowledge state array to determine whether the previously transmitted data block is associated with the tentative acknowledgment state.

\* \* \* \* \*